United States Patent [19]

Hönig et al.

[11] Patent Number: 5,109,040

[45] Date of Patent: Apr. 28, 1992

[54] AQUEOUS CATHODIC ELECTRO-DEPOSITION LACQUER COATING COMPOSITIONS AND METHOD OF USING THE SAME

[75] Inventors: Helmut Hönig, Graz, Austria; Kurt E. Jaeger, Wuppertal, Fed. Rep. of Germany; Klausjörg Klein, Wuppertal, Fed. Rep. of Germany; Dietrich Saatweber, Wuppertal, Fed. Rep. of Germany

[73] Assignee: Herberts Gesellschaft mit Beschrankter Haftung, Wuppertal, Fed. Rep. of Germany

[21] Appl. No.: 500,096

[22] Filed: Mar. 21, 1990

Related U.S. Application Data

[63] Continuation of Ser. No. 378,421, Jul. 10, 1989, abandoned, which is a continuation of Ser. No. 47,700, May 8, 1987, abandoned.

[30] Foreign Application Priority Data

May 10, 1986 [DE] Fed. Rep. of Germany ....... 3615810

[51] Int. Cl.⁵ .................. C08K 3/20; C08L 63/00
[52] U.S. Cl. .................. 523/411; 523/412; 523/414; 524/901
[58] Field of Search .................. 523/411, 412, 414; 524/901

[56] References Cited

U.S. PATENT DOCUMENTS

| | | |
|---|---|---|
| 3,947,339 | 3/1976 | Jerabek et al. |
| 4,009,133 | 2/1977 | Jones |
| 4,176,099 | 11/1979 | Pampouchidis et al. |
| 4,238,594 | 12/1980 | Pampouchidis |
| 4,320,220 | 3/1982 | Pampouchidis |
| 4,332,711 | 6/1982 | Kooymans et al. |
| 4,352,842 | 10/1982 | Kooymans et al. |
| 4,397,990 | 8/1983 | Kooymans et al. |
| 4,401,774 | 8/1983 | Kooymans et al. |
| 4,407,763 | 10/1983 | Sikorski et al. |
| 4,430,462 | 2/1984 | Jaeger et al. |
| 4,595,717 | 6/1986 | Patzschke ........... 523/414 |

OTHER PUBLICATIONS

Epoxy Resins and Products—Recent Advances—by M. William Ranney.

*Primary Examiner*—Paul R. Michl
*Assistant Examiner*—Peter Szekely
*Attorney, Agent, or Firm*—Donald A. Peterson

[57] ABSTRACT

Aqueous cathodic electrodeposition lacquer coating compositions are provided which comprise (A) certain water soluble synthetic resin binders containing amino groups; (B) crosslinking reagents which react with resin (A), and (C) certain soluble or insoluble transesterification catalysts for the crosslinking reagents. Methods of forming baked finish coatings which are cathodically deposited on electrically conductive surfaces using the lacquer coatings are also disclosed.

13 Claims, No Drawings

AQUEOUS CATHODIC ELECTRO-DEPOSITION LACQUER COATING COMPOSITIONS AND METHOD OF USING THE SAME

This application is a continuation of application Ser. No. 07/378,421, filed Jul. 10, 1989, now abandoned, which is a continuation of application Ser. No. 07/047,700 filed Jul. 10, 1987 now abandoned.

BACKGROUND OF THE INVENTION

1. Field of the Invention

This invention relates to an aqueous cathodic electrodeposition lacquer coating composition which contains (A) one or more amino-group-containing synthetic resin binders that can be made soluble or dispersible in water by protonization with acids, (B) crosslinking agents reacting therewith on baking and (C) soluble and/or insoluble transesterification and/or esterification catalysts for the thermal crosslinking reaction at temperatures above 100° C. and which optionally contain pigments, corrosion inhibitors, anti-cratering agents, lacquer auxiliaries, catalysts and organic solvents. The invention also relates to the use of this coating composition for cathodic deposition from a lacquer bath onto electrically conductive surfaces.

2. Description of the Related Art

Cathodic electrodeposition methods are described generally in U.S. Pat. Nos. 3,947,339 and 4,009,133, and additionally by Ranny, M. W. "Epoxy Resins and Products—Recent Advances," Noyes Data Corp., 1977, pp. 47-91.

DE-A-27 07 405 (U.S. Pat. No. 4,238,594) and DE-A-27 07 482 (U.S. Pat. No. 4,320,220) describes self-crosslinking binders for cathodic electrodeposition lacquers which are amino-group-containing reaction products and/or polyaddition products containing terminal or lateral double bonds.

According to DE-B-27 32 902 (U.S. Pat. No. 4,176,099), reaction products such as these may be used together with urethane compounds as binders for cathodic depositions. Disadvantages of binders such as these include their relatively high content of organic solvents emanating from the production process, the formation of surface defects, the inadequate elasticity of the coatings and adhesion problems with further coatings applied thereto.

EP-B-66 859 (U.S. Pat. No. 4,430,462) describes binder systems consisting of:

(A) mixtures or precondensates of synthetic resins containing terminal or lateral double bonds, primary and/or secondary hydroxyl groups and amino groups, (B) polyesters containing 8-hydroxyester groups as transesterification and/or transamidation hardeners and (C) transesterification catalysts.

One disadvantage of this system lies in the T formation of clevage products during the baking process.

In German patent application P 35 30 179.1-43, the polyesters containing 8-hydroxyester groups are replaced by special crosslinking agents which are Michael's addition products of monocarboxylic or dicarboxylic acid esters capable of Michael's addition and containing at least one double bond capable of Michael's addition and which, on average, contain either two reactive ester groups or one reactive ester group and one ethylenic double bond per molecule. Clevage products are again formed during the crosslinking reaction.

US-A-3 925 181 and US-A-3 975 251 describe secondary amino groups with compounds containing double bonds. (CED is an internationally used abbreviation for cathodic electro-deposition.) In this case, the crosslinking reaction is a Michael's addition of reactive amines to double bonds. The disadvantage lies in the inadequate stability of the CED baths because the Michael's addition can actually take place at room temperature. The instability of the CED baths can be reduced by complete neutralization of the primary and secondary amines. Obtaining a good crosslinking density presupposes a sufficiently large quantity of reactive amino groups and, hence, a correspondingly large quantity of neutralizing acid. This increases the amount of electricity required for deposition and the danger of disruption of film formation by gas bubbles at the cathode and reduces throwing power. In addition, the basicity of the coating leads to poorer anti-corrosion behavior, particularly after mechanical stressing, for example by loose chippings. The adhesion of subsequent coatings, for example in automobile production, is seriously affected by the basic primer coating.

SUMMARY OF THE INVENTION

The object of the present invention is largely to avoid the known disadvantages and significantly to improve open-air weathering and stone-throw resistance, particularly at baking temperatures of from 140° to 160° C.

It has been found that this object can be achieved by using coating compositions containing binder and catalysts of the type defined hereinafter.

The present invention relates to an aqueous cathodic electrodeposition lacquer coating composition which contains (A) one or more amino-group-containing synthetic resin binders that can be made soluble or dispersible in water by protonization with acids, (B) crosslinking reagents reacting with binder (A) on baking and (C) soluble and/or insoluble transesterification and/or esterification catalysts for the thermal crosslinking reaction at temperatures above 100° C. These compositions optionally contain pigments, corrosion inhibitors, anticratering agents, lacquer auxiliaries, catalysts and organic solvents. The composition may be further characterized in that as to components (A) and (B), (A) comprises from 95 to 5% by weight, based on the synthetic resin binders as a while, of one or more polycondensation, polymerization and/or polyaddition resins, or mixtures thereof, wherein the resin or, where several resins are present, the mixture of resins
  (a) have a number-average molecular weight ($\overline{Mn}$) of from 700 t 10,000,
  (b) contain from 0 to $21.7 \times 20^{23}$ lateral or terminal double bonds per 1000 g, corresponding to a hydrogenation iodine number of from 0 to 90,
  (c) contain primary hydroxyl groups corresponding to a hydroxyl number of rom 15 to 300, and
  (d) contain tertiary amino groups corresponding to an amine number of 30 to 150, and wherein (B) comprises from 5 to 95% by weight, based on the synthetic resin binder as a whole, of polymerization, polycondensation and/or polyaddition resins, or mixtures thereof, having a number average molecular weight ($\overline{Mn}$) of from 170 to 10,000 and containing on average at least two terminal or lateral ethylenic double bonds per molecule and less than one terminal ester group capable of transesterification on baking per molecule.

The present invention also relates to a method of coating a surface which comprises depositing a film of a lacquer composition as described above onto an electrically conductive surface of an object and after removing the said object having an electrically conductive surface from the coating bath, baking said film at a temperature not exceeding 210° C. The baking temperature used may also be lower, preferably not exceeding 190° C. and most preferably not exceeding 170° C. Generally the temperature and time used for baking should be sufficient to fuse the lacquer to the surface in a smooth adherent coating.

By virtue of the absence or at least the small number of hydrolytically clevable ester groups, the CED material according to the invention is highly stable to hydrolysis.

By skillful production of components (A) and (B), it is possible for the crosslinking reaction to take place during baking without any emission of environmentally harmful clevage products.

Components (A), (B) and/or (C) may be used both in the form of mixtures and in the form of precondensates or prepolymers, i.e. by heating the mixtures, optionally in an inert gas atmosphere, to temperatures of 40° to 200° C. or higher. This precondensate or prepolymer formation is known from the prior art and is intended to produce better co-deposition of the various components during the electrical coating process. The heating of the components can of course also produce other advantageous effects, such as purer ultrafiltrate, better dispersion, a smoother film surface and better adhesion properties.

Hitherto, it has been assumed that the crosslinking of the electrodeposition lacquer binders containing terminal or lateral double bonds in the absence of conventional crosslinking agents is brought about solely "by thermal polymerization of the $\alpha, \beta$-unsaturated double bonds", as described in DE-A-27 07 405.

Accordingly, it could not be foreseen that crosslinking would be significantly increased by the presence of relatively high molecular weight polyols containing primary hydroxyl groups, particularly at relative low baking temperatures (low bake). In addition, the effective use of transesterification and esterification catalysts for the thermal crosslinking of synthetic resin binders containing primary or secondary hydroxyl groups with crosslinking agents (B) was not known, especially since the crosslinking reaction can be neither a transesterification nor an esterification.

The significance of the primary hydroxyl groups to crosslinking with the crosslinking component (B) was demonstrated by tests with tertiary amino-acrylates containing primary, secondary or no hydroxyl groups. Maximal crosslinking occurred in the presence of the resin containing primary hydroxyl groups, particularly at low baking temperatures. The secondary hydroxyl groups produced slightly less crosslinking at relatively low baking temperatures, while hardly any crosslinking was obtained with the resin free from hydroxyl groups, even under stoving conditions of 60 minutes at 180° C.

The binders of component (A) are known and may be prepared, for example, in accordance with the Examples of EP-B-12 463 (see U.S. Pat. Nos. 4,332,711; No. 4,352,842; No. 4,397,990; No. 4,401,774, and No. 4,407,763.), EP-A-40 867, EP-B.-66 859 (U.S. Pat. Nos. 4,362,847 and 4,427,805) (U.S. Pat. No. 4,430,462) (Examples A1, A3 and A6), EP-A-137 459 (U.S. Pat. Nos. 4,595,717 and 4,600,485 and DE-A-34 36 346 (Examples A1 and A2). Intercoat adhesion is promoted by the incorporation of substituted urea groups in component (A) and/or (B), which may be introduced into the binder molecule, for example, by reaction of polyisocyanate or blocked polyisocyanate with monoamine and polyamine.

The binder of component (A) has a number average molecular weight $\overline{(Mm)}$ of from 700 to 10,000 and preferably from 1500 to 5000. It contains at least one tertiary amino group per molecule.

The lower limit to the amine number should preferably be at 50 and more preferably at 70 while the upper limit should preferably be at 120 and more preferably at 100. If the amine number is too low, solubility is inadequate or excessively acidic pH values are formed in the deposition baths through an excessively high degree of neutralization. If the amine number is too high, a poorly adhering film or a blistered surface is formed during deposition. The binders of component (A) may be of the type which are substantially free from carboxyl groups.

Amino-epoxy resins containing hydroxyl groups are best obtained from polyglycidyl ethers containing at least two 1, 2-epoxide groups per molecule. They may be prepared by
(a) introduction of glycidyl groups in alkaline medium, for example through epichlorohydrin,
  (aa) into aliphatic, cycloaliphatic or aromatic OH-functional resins, for example epoxy-novolaks, to form polyglycidyl ethers,
  (ab) into aliphatic, cycloaliphatic or aromatic COOH-functional resins to form polyglycidyl esters or
  (ac) into aliphatic, cycloaliphatic or aromatic $HN_2$—functional resins to form polyglycidyl amines,
(b) incorporation of unsaturated glycidyl monomers, such as glycidyl(meth)acrylate, N-glycidyl(meth)acrylamide or allyl glycidyl ether by polymerization in acrylic copolymers.

In a particularly preferred embodiment of (a), the resins containing 1,2-epoxide groups are polyglycyidyl ethers corresponding to the following general formula

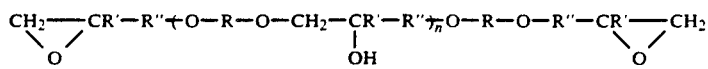

in which

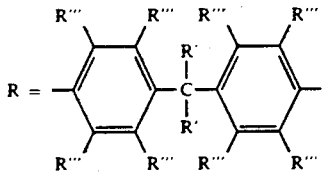

R' = hydrogen or —$C_nH_{2n+1}$
R" = —$(CR'_2)_n$-
R''' = R' or halogen, preferably hydrogen
m = 0 to 6,
n = 1 to 3

They have a number average molecular weight ($\overline{Mm}$) of from about 300 to 2000 and an epoxide equivalent weight of from about 170 to 1500. Resins such as these are reaction products of epichlorohydrin with dihydroxydiphenylmethane (bisphenol F) or dihydroxydiphenylpropane (bisphenol A). Polyepoxides of suitable molecular weight are prepared either by suitable choice of the reaction conditions in the reaction of the bisphenol with epichlorohydrin or by reaction of the monomeric diglycidyl compound with more bisphenol or with long-chain polyalcohols, such as 1,6-hexanediol polytetrahydrofurnandiol, polycaprolactonediol, polycaprolactamdiol or polybutadienediol, in the presence of suitable basic or acidic catalysts, such as boron fluoride complexes. It is also possible to use corresponding heterocyclic polyepoxy compounds, such as 1,3-diglycidyl-5,5-dimethylhydantoin, triglycidyl isocyanurate or diepoxides of bisimides.

In a preferred embodiment of (b), the resins containing epoxy groups are glycidyl(meth)acrylate copolymers obtained by copolymerization of glycidyl methacrylate with unsaturated monomers. Unsaturated monomers are styrene, vinyl toluene, (meth)acrylates of various chain lengths, the methacrylates preferably containing linear or branched $C_1$-$C_4$ alcohols and the acrylates preferably containing linear or branched $C_2$-$C_8$ alcohols. The amino groups may be introduced either by copolymerization with unsaturated amines, such as dialkylaminoalkyl (meth)acrylates corresponding acrylamides or N-vinylimidazole, or by reaction of preferably secondary amines or aminoalcohols with the epoxy groups.

The amino groups may be introduced into component (A) either by addition of NH-reactive compounds to the epoxy group or by reaction of the hydroxyl groups of the base resin with basic monoisocyanates formed by reaction of aromatic and/or aliphatic and/or cycloaliphatic diisocyanates or polyisocyanates with dialkylaminoalkanol (cf. DE-A-2 707 405).

The NH-reactive compounds used are primary aminoalkylamines, such as dialkylaminoalkylamine, and/or preferably secondary monoamines, such as dialkylamines, monoalkylhydroxyalkylamines or dihydroxyalkylamines. Examples of suitable compounds are diethylamine, dimethylaminopropylamine, N-methylaminoethanol or diethanolamine. Where primary amines or secondary diamines are used, chain extension occurs, for example where addition products of 1,6-hexanediamine with 2 moles of the glycidyl ester of versatic acid are used. Alkydiaminoalkanes or reaction products of saturated glycidyl ethers with primary diaminoalkanes may also be used as secondary diamines, preferably long-chain diamines. The appropriate number of hydroxyl groups on the one hand is formed automatically from the epoxy group during the addition of the secondary amino groups, on the other hand it may be controlled by the use of hydroxyalkylamines.

The molar ratios between the compounds containing epoxide groups and the compounds containing amino groups should be selected to guarantee full incorporation of the amine, because disruptive surface faults can occur during electrophoretic coating, i.e. a slight excess of epoxy groups is advantageous. The reaction of the amines actually begins at room temperature and is generally exothermic. In order to obtain a complete reaction, the temperature generally has to be increased periodically to around 50° to 120° C. Before addition of the amine, the resin containing 1,2-epoxide groups is dissolved in organic solvents, such as xylene, methylisobutylketone, which have to be subsequently distilled off before dilution, or in such solvents as ethylene glycol monoethyleter, propylene glycol monoethyleter, diethylene glycol dimethyleter or diacetone alcohol which may remain in solution. Any amine residues may be removed by thin-layer evaporation or steam distillation. Primary monoamines and polyamines are converted into tertiary amines in the presence of a sufficient number of epoxide groups. If the epoxide groups are not sufficient, primary and secondary amino groups may remain in component (A). A small proportion of primary and secondary amino groups corresponding to an amine number below 20 and preferably below 10 is generally harmless. Higher proportions of reactive amino groups can lead to premature gelatinization or at least to a reduction in stability.

Double bonds may be introduced into component (A) either directly by addition to the epoxy groups or indirectly by reaction of the hydroxyl group of the base resin with unsaturated monoisocyanates obtained by reaction of aromatic and/or aliphatic and/or cycloaliphatic di- or polyisocyanates with α, β-unsaturated monocarboxylic acids or corresponding carboxylic acid amides, such as hydroxyalkyl (meth)acrylates or dicarboxylic acid esters of hydroxyalkyl (meth)acrylates, of the type described in DE-A-2 707 482. The compounds selected are those which give largely heat stable urethane groups by virtue of their structure in the molecular bond. The direct addition to the epoxy group may be effected, for example, with diallylamine, unsaturated fatty amines or even unsaturated fatty acids.

Suitable chain-extending agents are unsaturated dicarboxylic acids, such as fumaric acid, or dimerized fatty acid or even adducts of unsaturated monoepoxy compounds with di- or polyamines containing at least two primary amino groups or at least one primary and one secondary amino group, such as 1,6-hexanediamine, 3-aminomethylaminopropylamine, diethylenetriamine, trimethyl hexamethylenediamine and isophoronediamine, corresponding to the following formula

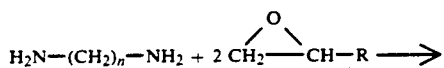

-continued

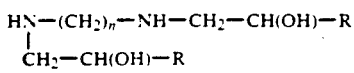

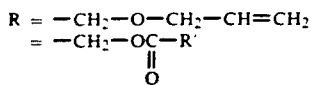

$R = -CH_2-O-CH_2-CH=CH_2$
$= -CH_2-OC-R'$
$\quad\quad\quad\;\;\|$
$\quad\quad\quad\;\;O$ R' = unsaturated hydrocarbon radical of fatty acids The unsaturated monoepoxy compounds used may be
(a) glycidyl esters of linear or branched, isolated or conjugated, unsaturated $C_3-C_{18}$ monoalchols.
(b) glycidyl ethers of linear or branched, isolated or conjugated, unsaturated $C_3-C_{18}$ monoalochols.

The amino groups of the polyamines are reacted substantially stoichiometrically at around 50° to 105° C. with unsaturated monoepoxide compounds in such a quantity that one molecule containing two reactive secondary amino groups is formed, reacting as chain-extending agent with more polypoxide. Examples include the reaction products of one mole of glycidyl allylether with amionethyl ethanolamine or of two moles of linoleic glycidyl ester with ethylenediamine. Where three reactive sites are used, branches are incorporated. Chain extension may also be effected by incorporation of unsaturated substituted primary amines, such as primary allyamine.

Another method of production comprises transetherification with an etherified, methyloated (methyl)acrylamide, for example methylolacrylamide monobutylether. as described in DE-A-2 934 467. Unsaturated double bonds may also be introduced in the same way by reaction with unsaturated formaldehyde condensation resins, such as phenoplasts or aminoplasts. Suitable phenolic resins, are, for example, reaction products of mono- and/or polynuclear, optionally alkyl-substituted phenols with formaldehyde or formaldehyde donors, such as paraformaldehyde. The methyol groups may be partly or completely etherified with methanol, ethanol, propanol, butanol and/or unsaturated monoalchols, such as allyl alcohol, hydroxyalkyl (meth)acrylates or oleyl alcohol. Etherified phenolic resins may also be produced by reaction with unsaturated monoepoxides, such as glycidyl allyl ethers or glycidyl methyl acrylate. A further modification is possible by reaction with unsaturated monoepoxides, such as glycidyl allyl ethers or glycidyl methyl acrylate. A further modification is possible by reaction with unsaturated monocarboxylic acids, such as (meth)acrylic acid, maleic acid or fumaric acid monoesters, or unsaturated fatty acids, such as oleic acid, linoleic acid, linoenic acid, or natural mixtures thereof. Low molecular weight unsaturated phenolethers, such as the polymethylol compounds of phenolallyl ether (Methylon resin (R) 75 108, a product of General Electric). Unsaturated aminoplasts may be obtained by reaction of methylolated melamine, benzoguanamine or urea resins with unsaturated monoalcohols or monocarboxylic acids.

Particularly preferrred starting materials for binders of component (A) are reaction products of bisphenol A, bisphenol F and/or novolaks with ephiclorohydrin. Novolaks are understood to be reaction products of phenols with aldehyde, as described in "Lackkunstharze" by H. Wagner and H. F. Sarx, Carl Hanser Verlag, Munich 12959, pages 42, 45 and 46. Instead of phenol itself, suitable homologs and derivatives of phenol may be used for the production of novolaks.

Component (A) contains primary hydroxyl groups corresponding to a hydroxyl number of from 15 to 300 and preferably of from 20 to 180. Secondary hydroxyl groups are largely formed in the reaction of secondary and primary amines with 1,2-epoxide groups. Primary hydroxyl groups may be introduced. for example, into component (A) by using alkanolamines containing primary hydroxyl groups, such as diethanolamine.

Another method of producing CED binders containing primary hydroxyl groups is based on the optionally partial reaction of epoxide groups of an epoxy resin with polyols, such as diols, triols, etc., for example with polycaprolactonediol, and introduction of tertiary amino groups in known manner.

(Meth)acrylate resins containing primary hydroxyl groups may be produced by co-use of monomers containing primary hydroxyl groups, for example hydroxy(meth)acrylate. The simultaneous copolymerization of unsaturated glycidyl monomers introduces 1,2-epoxide groups which are reacted with amines in known manner. The graft polymerization of (meth)acrylate monomers to aminoepoxy resins containing terminal or lateral double bonds can also lead to CED binders for component (A) where hydroxyethyl (meth)acrylate, for example, is co-used.

Polycondensation resins containing primary hydroxyl groups may be obtained from reactive polyaminoamide resins, of the type described in "Lehrbuch der Lacke und Beschichtungen" by H. Kittel, Verlag W. A. Colomb in der Heenemann GmbH Stuttgart-Berlin, Vol. I, Part 1, 1971, pages 509 to 511, by reaction with 1,2-epoxide compounds containing primary hydroxyl groups, such as glycidol (2,3-epoxy-1-propanol).

Component (B), which is used for crosslinking with component (A), has a number average molecular weight ($\overline{Mn}$) of from 170 to 10,000 and preferably of from 250 to 6000. It must contain on average at least two terminal or lateral reactive double bonds per molecule. The reaction starting out from the double bonds should take place so quickly that adequate crosslinking is obtained at baking temperatures of from 140° to 160° C. or lower. Double bonds of acrylic or methacrylic groups are particularly suitable for this purpose.

Component (B) may consist of suitable acrylic acid compounds, such as ethylene glycol diacrylate, 1,3-butylene glycol diacrylate, bisphenol-A-diacrylate, diethylene glycol diacrylate, triethylene glycol diacrylate, tetraethylene glycol diacrylate, 1,6-hexanediol diacrylate, polyethylene glycol diacrylate, trimethylolpropane diacrylate, trimethylolpropane triacrylate, pentaerythritol diacrylate, pentaerythritol triacrylate, pentaerythritol tetra-acrylate and melamine acrylate and also the corresponding methacrylic acid compounds.

Another possibility is to use methacrylamide or acrylamide compounds which are fused to compounds and resins containing corresponding functional groups, for example hydroxyl groups, by known methods, for example after reaction of the amides with formaldehyde and optionally after etherification of the methylol groups formed. Another method of preparing component (B) is to react glycidyl acrylate or glycidyl methacrylate with compounds or resins containing carboxyl groups. Since β-hydroxyester groups are formed in this way, it is important to ensure that no cleavage products are formed by transesterification during the baking process. If the unsaturated glycidyl compounds are reacted with compounds or resins containing primary or secondary amino groups, there is considerably less risk of cleavage products being formed.

Component (B) may also be prepared by transesterification of esters and polyesters or by reaction of diisocyanates, isocyanate-group-containing prepolymers, precondensates and synthetic resins with hydroxyalkyl (meth)acrylate, for example by reaction of the reaction product of 1 mole trimethylolpropane and 3 moles tolylene diisocyanate with 3 moles 2-hydroxyethyl acrylate.

Component (B) may optionally contain tertiary amino groups to achieve better dispersion in water. In such cases, the quantity of tertiary amino groups must be so large or so small that composition with component (A) is guaranteed.

It is of course also possible directly to introduce groups containing double bonds, for example the acrylic group, into the synthetic resin molecule of component (A), so that CED binders self-hardening to a certain extent are formed. However, it is of advantage to add component (B) to the system as a reactive diluting component so that CED coatings of greater layer thickness (30 to 50 um) and excellent throwing power are obtained.

For crosslinking without the formation of cleavage products, component (B) best contains less than 1, preferably less than 0.5 and, more preferably, substantially no terminal ester groups capable of transesterification on baking per molecule. By "substantially" is meant that, essentially, no such groups are present although, in the case of high molecular weight products of the type in question, the presence of a very small number of such groups is always possible.

In addition to the crosslinking agents of component (B), it is possible to use other crosslinking agents useful for cathodic deposition systems, such as blocked polyisocyanates, $\beta$-hydroxyesters, melamine resins, phenolic resins, phenolallylether-formaldehyde resins. In this way, it is possible to improve certain properties, for example pigment wetting and the appearance of the film surface, without any significant loss of reactivity.

By suitable choice of the binders of component (A) containing more or less reactive hydroxyl groups and crosslinking agents containing acrylic or methacrylic groups, it is possible to establish optimal leveling properties and to obtain outstanding bath stability.

The ratio by weight of component (A) to component (B) is 95–5% of component (A) to 5–95% of component (B) and preferably 95–40% of component (A) to 5–60% of component (B).

Suitable crosslinking catalysts, component (C), are transesterification and esterification catalysts. The optimal quantity gas to be specially determined for each catalyst or for each catalyst mixture with the binder or binder mixture used. In general, from 0.1 to 10% and preferably from 1to 6% of metal, based on components (A) and (B) as a whole, is used in the form of the metal oxides, metal sals and/or metal complex compounds, for example metals of monovalent or polyvalent metals.

Examples of suitable catalysts are lead octoate, lead silicate, left naphthenate, the zinc compounds according to DE-C-28 07 698, for example Alcophor(R)827, a product of Henkel and DE-A-33 06 064, zinc and zinc-lead compounds of nitrophthalic acid (Sicorin(®), products of BASF), complex compounds of zinc oxide and 8-hydroxyquinoline also usable "in situ"), antimony trioxide, cobalt naphthenate, cadmium acetyl acetonate, thalium dicyclo-pentadiene, triethanolamine titanate and organotin compounds, for example dibutyltin dilaurate and Swedcat 5(®), a product of Swedstab AB, Sweden.

Water-soluble metal compounds are also suitable where the metal is deposited in finely divided form with the lacquer either as a compound or as a complex.

The metal oxides, metal salts or metal complex compounds need only be mixed in cold or may be heated with the binders to 40° to 250° C., optionally in an inert gas atmosphere.

So far as the effect of octoates and naphthenates is concerned, it can be of advantage to remove the solvents, for example aliphatic and aromatic hydrocarbons, present in the commercial products by evaporation and to add the metal compounds in predominantly water-dilutable solvents which are highly compatible with the binder or binder mixture.

One advantageous method of incorporating the catalyst in the CED material is to add special metal oxides, for example lead(II) oxide, during the grinding of the pigments and pillers (extenders), especially since the acid component used to stabilize the system as a whole is distinctly reduced by this measure.

Catalysts which accelerate the Michael's addition may also be used for the electrodeposition lacquer coating composition according to the invention providing it can be incorporated in the system without any disadvantages.

The catatonic binder is made dispersible in water in known manner be protonization with acids.

Any of the pigments suitable for CED may be used for the electrodeposition lacquer coating composition according to the invention In the context of the invention, pigments are also understood to include fillers (extenders), aluminium bronzes and the like. The suitability of a pigment is not determined by the direction in which it migrates in the electrical field because, in electrodeposition, the deposition process is initiated by the coagulation of the ED binder, as can be seen in the articles "Zum Mechanismus der elektrophoretisch Lackierung" by Dr. Fritz Beck, Farbe und Lack, Vol. 72, no. 3, 1966, pages 218 to 224 and "Betrachtungen und Versuche zur Elektrotauchlackierung" by Dr. F. Beck, Dr. H. Pohlemann and Dr. H Spoor, Farbe und Lack, Vol. 73, no. 4/1967, pages 298 to 310. Nonionic binders, such as for example plasticizers (dibutylphthalateand other phthalic acid esters, plasticizer resins, coumarone-indene resins, indene resins, hydrocarbon resins and the corresponding oils (for example coumarone-indene oil), may be added to improve special properties providing they may be emulsified into the CED bath through original and refill material.

Additives, such as leveling agents' anti-cratering agents, antifoam agents, solvents, etc., may be selected and added in known manner.

The metallic electrically conducting workpieces are cathodically coated with the electrodeposition lacquer coating composition according to the invention and baked for 15 to 60 minutes, preferably at temperatures not exceeding 210° C. and more preferably not exceeding 190° C. and most preferably at temperatures of 130 to 170° C., in known manner. Satisfactory results, however, may of course also be obtained by using baking temperatures throughout the range of 170 to 210° C. Generally, the times and temperatures employed are those which result in a fused adherent coating of the lacquer on the coated substrate.

In cases where relatively coarse particles are formed in the bath during or after production, it can be of advantage to apply an ultrasonic treatment according to DE-C-31 13 881. This process, which is used for electro-powder coating, often enables even very difficult particles, which would accumulate as sieve and filter resides, to be dispersed in the ED bath. In order to keep the amount of acid required to stabilize the CED bath desirably small, a minimal quantity of acid is added and the bath is subsequently ultrasonicated to improve the level of dispersion.

DESCRIPTION OF THE PREFERRED EMBODIMENTS

EXAMPLES

All figures in percent (%) represent percent by weight, unless otherwise indicated.

CED binder A1

In accordance with EP-B-12 463, 301 g diethanolamine, 189 g 3-(N,N-dimethylamino)-propylamine and 1147 g of an adduct of 2 moles 1,6-hexanediamine and 4 moles of the glycidyl ester of versatic acid (Cardura (R)E 10, a product of shell) are added to 5273 g of bisphenol-A-epoxy resin (epoxide equivalent weight 475) in 3000 g of ethoxypropanol. The reaction mixture is stirred for 4 hours at 85° to 90° C. and then for 1 hour at 120° C. It is then diluted with ethoxypropanol to a solids content of 60%.
Hydroxyl number: 276 mg KOH/g solid resin
Hydroxyl number, based on primary hydroxyl groups: 55 mg
KOH/g solid resin
Hydrogenation iodine number: substantially 0
Amine number, based on tertiary amino groups: 78 mg KOH/g solid resin

CED binder A2

3120 g of a binder solution are prepared in accordance with DE-B-27 32 902, column 9, Example A2, from 706 g of bisphenol-A-epoxy resin (epoxide equivalent weight 260), 631 L of EGA (ethyl glycol acetate, monoethylene glycol monoethylether), 0.25 g of hydroquinone, 765g of the semiester of tetrahydrophthalic acid anhydride and hydroxyethyl methacrylate and 1017 g of a 70% solution of a monoisocyanate of tolylene diisocyanate and mimethylethanol-amine in EGA and mixed with 1930 g of CED binder A1.
Characteristics of the mixture:
Solids content: 66.2%
Hydroxyl number: 158 mg KOH/g solid resin
Hydroxyl number, based on primary hydroxyl groups: 22 mg KOH/g solid resin
Hydrogenation iodne number of the solid resin: 18
Amine number, based on tertiary amino groups: 74 mg KOH/g solid resin.

Crosslinking agent B1

875 g of a 75% solution of an adduct of 2,4-tolylene diisocyanate and trimethylolpropane (molar ratio 3:1) in ethyl acetate (Desmodur(R)L/75) is diluted with xylene to a solids content of 50%, followed by the addition of 0.25 g of hydroquinone. After the addition of 8 g of hydroxyethyl acrylate, the reaction mixture is heated for about 3 hours with reflux cooling until the NCO value has fallen to substantially zero. Ethyl acetate is then removed by fractional distillation, during which the temperature of the reaction mixture must not exceed 100° C., optionally by application of a vacuum, until a solids content of 75% is reached. The reaction mixture is then diluted with methylisobutylketone to a solids content of 70%.
Solids content: 70%
Average molecular weight (Mn): 1004
The crosslinking agent contains on average 3 terminal double bonds per molecule with no terminal or lateral β-hydroxyester groups.

Crosslinking agent B2

In accordance with DE-C-27 07 482, a synthetic resin is prepared as described in "Examples 1 to 12", from 950 g of bisphenol-A-epoxy resin (epoxide equivalent weight 450 to 500), 500 g of EGA, 210 g of diethanolamine, 1129 g of monoisocyanate pre-product of 452 g of tolylene diisocyanate, 338 g of hydroxyethyl methacrylate and 339 g of EGA. The reaction product is diluted with ethoxypropanol to a solids content of 60%.
Solids content: 60%
Average molecular weight (Mn): 1950
The crosslinking agent contains on average 2.6 terminator lateral double bonds per molecule with no terminal or lateral β-hydroxyester groups.

Crosslinking agent B3

B3 is prepared in the same way as crosslinking agent B2 using hydroxypropyl acrylate instead of hydroxyethyl methacrylate and has the same characteristics as B2.

Crosslinking agent B4

A copolymer is prepared in known manner from 120 g of ethyl acrylate, 250 g of methyl acrylate, 250 g of n-butyl acrylate, 250 g of styrene and 180 g of acrylic acid in 695 g of EGA using 20 g of azodiisobutyronitrile and 20 g of tert.-dodecyl mercaptan. After the addition of 0.2 g of hydroquinone and 355 g of glycidyl methacrylate, the copolymer is reacted at 110° C. to an acid number below 5 mg KOH/g solid resin.
Solids content: 65%
Average molecular weight (Mn): 3500
The crosslinking agent contains on average more than 2 terminal or lateral double bonds per molecule with no terminal or lateral hydroxyester groups.

Crosslinking agent B5

485 g of dimethyl terephthalate and 555 g of neopentyl glycol are heated to 200° C. and kept at that temperature until the theoretical quantity of methanol has distilled off. After addition of 645 g of adipic acid, the mixture is esterified at 190° C. to an acid number of 131 mg KOH/g. The reaction product is then reacted with 401 g of tris-hydroxymethylaminomethane to an acid number of less than 1 mg KOH/g. The polyester is diluted with EGA to a solids content of 70%.

1430 g of the 70% solution of the hydroxylgroup-containing polyester are reacted with 1300 g of monoisocyanate pre-product of 522 g of tolylene diisocyanate, 390 g of hydroxypropyl acrylate and 388 g of EGA at 65° C. to an NCO value of substantially zero.
Solids content: 70%
Average molecular weight (Mn): 1800

The crosslinking agent contains on average more than 2 terminal or lateral double bonds per molecule with no terminal or lateral β-hydroxyl groups.

EXAMPLE 1

116 g of crosslinking agent B1, 3.5 g of lead octoate (31% Pb), 30 g of glacial acetic acid (98 to 100%) and 4507 g of fully deionized water are added with thorough stirring to 743 g of CED binder A1. From the CED bath, which has a solids content of 10%, lacquer films are cathodically deposited onto steel plate and baked for 30 minutes at 160? C. The baked lacquer films, which have a layer thickness of 16 to 18 μm, are tough, elastic and smooth.

The result of the MEK resistance test is shown in Table 1.

EXAMPLE 2

505 g of CED binder A2 are homogeneously mixed with thorough stirring with 50 g of ethoxypropanol, 6 g of litharge (lead(II)oxide), 20 g of lead silicate, 2.4 g of carbon black and 235 g of titanium dioxide and the resulting mixture ground in a bead mill.

The mixture is completed with 273 g of CED binder A2, 161 g of crosslinking agent B1, 50 g of phenoxypropanol and 31 g of formic acid in the form of a solution in water.

A CED bath is then prepared with 4067 g of fullydeionized water. After open stirring for 2 to 3 days, lacquer films are cathodically deposited onto steel plate and baked for 40 minutes at 160° C. The dry film layer thickness is 19 to 21 um. The result of the MEK resistance test is shown in Table 1.

EXAMPLE 3

A CED bath is prepared as in Example 2 from 380 g of CED binder A1, 2 g of 2,2,4-trimethylpentane-1,3-diol monoisobutyrate, 9 g of lead octoate (31% Pb), 13.4 g of lead silicate, 1,6 g of carbon black, 169 g of titanium dioxide, 28 g of aluminium silicate, 25 g of ethoxypropanol, 103 g of CED binder A1, 103 g of trimethylolpropane triacrylate (component B), 17 g of formic acid, 50% in water, and 2450 g of fully deionized Solids content: 18%, pH value: 5.8 MEQ-value = 37 mmoles acid/100 g solids; conductivity: .1570 μs.cm-1

Zinc-phosphated and non-pre-treated steel plates are cathodically coated at a bath temperature of 30° C. and at a coating voltage of 250 to 300 V. The test results of the coatings baked for 30 minutes at 160° C. (dry film thickness 39 to 41 μm) are shown in Table 1.

EXAMPLE 4

A CED bath is prepared as described in Example 2 from 283 g of CED binder A1, 182 g of CED binder A2, 50 g of phenoxypropanol, 16.3 g of lead silicate, 152 g of titanium dioxide, 1.7 g of carbon black, 212 g of crosslinking agent B2, 15 g of glacial acetic acid (98 to 100%) and 2391 g of fully deionized water.

After baking for 30 minutes at 155° C., the coatings cathodically deposited onto zinc-phosphated steel plates (layer thickness 21 to 23 um) are smooth, tough and elastic. The test results are shown in Table 1.

EXAMPLE 5

The CED bath is prepared in the same way as described in Example 4, but with crosslinking agent B3 instead of B2.

After baking for 30 minutes at 150° C., the lacquer films cathodically deposited on zinc-phosphated steel plates (layer thickness 25 μm) are smooth, tough and elastic. The test results are shown in Table 1.

EXAMPLE 6

The CED bath is prepared in the same way as in Example 5, but with 30 g of zinc cyanurate instead of 16.3 g of lead silicate.

After baking for 30 minutes at 160° C., the lacquer films cathodically deposited onto steel plate (layer thickness 20 μm) are smooth, tough and elastic.

EXAMPLE 7

The solvents of a commercial lead octoate are distilled off in a rotary evaporator to a solids content of 95%.

8.8 g of the 95% lead octoate (41% Pb) are added to and thoroughly mixed with 350 g of CED binder A1 and 30 g of phenoxypropanol. After the addition of 138 g of crosslinking agent B4, 8.3 g of glacial acetic acid (98 to 100%) and 2473 g of fully deionized water, a CED bath having a solids content of 10% is formed. After baking for 60 minutes at 60° C., the lacquer films cathodically deposited onto steel plate (layer thickness 17 um) are smooth, tough and elastic.

EXAMPLE 8

The CED bath is prepared in the same way as described in Example 7, but with 128 g of crosslinking agent B5 in-stead of 138 g of crosslinking agent B4.

The lacquer films deposited in the same way are subjected to the same conditions as in Example 7 and produce similar results.

TABLE 1

Testing of the coatings

| Example | MEK rubs[1] | Hardness[2] | Indentation[3] | Infiltration[4] ST[5] | ZP[6] |
|---|---|---|---|---|---|
| 1 | 100 | 169 | 6.4 | | |
| 2 | 100 | 181 | 7.1 | | |
| 3 | | 161 | 7.2 | 1.0 | 0.3 |
| 4 | | 193 | 5.9 | | 0.5 |
| 5 | | 190 | 6.4 | | 0.4 |
| 6 | | 165 | 5.6 | | 0.7 |

[1] Number of double rubs with cotton wool impregnated with methylethylketone under a weight of 1 kg until the film is visibly affected
[2] König pendulum hardness according to DIN 53 157 (secs.)
[3] Erichsen indentation according to DIN 53 156 (mm)
[4] Salt spray test results according to DIN 50 021 and 53 167
[5] Non-pretreated steel (360 hours' salt spray mist testing)
[6] Zinc-phosphated steel (504 hours' salt spray mist testing)

We claim:
1. An aqueous cathodic electrodeposition lacquer coating composition which comprises the following components (A) one or more binders or synthetic amino-epoxy resins containing hydroxyl and aminogroups which can be made soluble or dispersible in water by protonization with acids, and which resins are substantially free of carboxyl groups, (B) synthetic (meth)acrylic resin crosslinking reagents which react with binder (A) on baking, and (C) soluble and/or insoluble transesterification and/or esterification catalysts for thermal crosslinking reaction at temperatures about 100° C. wherein:
   (a) comprises from 95 to 5% by weight, based on the resin solids content of the aggregate of components (A) and (B), of one or more polymeric amino-epoxy resins obtained by reaction of components which contain at least two epoxy groups with components which contain an amino group, or mixtures thereof, wherein the resin or resins,
(a) have a number average molecular weight ($M_n$) of from 700 to 10,000, and
(b) contain from 0 to $21.7 \times 10^{23}$ lateral or terminal double bonds per 1000 g, corresponding to a hydrogenation iodine number of from 0 to 90,
(c) contain primary hydroxyl groups corresponding to a hydroxyl number of from 15 to 150; and
(d) contain tertiary amino groups corresponding to an amine number of from 30 to 150, and wherein:
(B) comprises from 5 to 95% by weight, based on the aggregate of components (A) and (B), of a crosslinking agent comprising compounds selected from the group consisting of acrylic or methacrylic acid esters of polyhydroxyl alcohols (meth)acrylamide compounds reacted with hydroxylated compounds, glycidyl (meth)acrylate reaction products with compounds containing carboxyl or primary or secondary amino groups, transesterification products of esters and polyesters of (meth)acrylic acids and polymeric reaction products of isocyanate group containing compounds or prepolymers with hydroxyalkyl (meth)acrylate esters, or mixtures thereof having a number average molecular weight ($M_n$) of from 170 to 10,000 and containing on average at least 2 terminal or lateral ethylenic double bonds in the acrylic or (meth)acrylic groups of said polymers per molecule and containing less than 1 terminal ester group per molecule capable of transesterification on baking.

2. A coating composition as claimed in claim 1, characterized in that component (A) is present in a quantity of from 95 to 40% by weight and component (B) is present in a quantity of from 5 to 60% by weight, said percentages being based on the aggregate resin solid content of components (A) and (B).

3. A coating composition as claimed in claim 1, wherein component (B) contains on average at least 2 groups corresponding to the following formula:

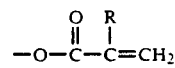

in which R represents hydrogen or the methyl group, per molecule.

4. A coating composition as claimed in claim 1 wherein component (B) contains on average less than 0.5 terminal ester groups capable of transesterification on baking per molecule.

5. A coating composition as claimed in claim 4, wherein component (B) contains substantially no terminal ester groups capable of transesterification on baking.

6. A coating composition as claimed in claim 1 wherein component (A) has a number average molecular weight ($\overline{Mn}$) of from 1500 to 5000.

7. A coating composition as claimed in claim 1 wherein component (A) contains primary hydroxyl groups corresponding to a hydroxyl number of from 20 to 180.

8. A coating composition as claimed in claim 1 wherein component (A) comprises modified bisphenol-A- and/or bisphenol-F- and/or novolak-epoxy resins.

9. A coating composition as claimed in claim 1 wherein component (A) contains primary and/or secondary amino groups corresponding to an amine number of less than 10.

10. A coating composition as claimed in claim 1 wherein component (B) has a number average molecular weight ($\overline{Mn}$) of from 250 to 6000.

11. A method of coating a surface which comprises cathodically depositing a film of a lacquer as described in claim 1 onto electrically conductive surfaces and baking said film at a temperature not exceeding 210° C.

12. The method of claim 11, wherein the lacquer film is baked at a temperature not exceeding 190° C.

13. The method of claim 11, wherein the lacquer film is baked at a temperature not exceeding 170° C.

* * * * *

UNITED STATES PATENT AND TRADEMARK OFFICE
CERTIFICATE OF CORRECTION

PATENT NO. : 5,109,040            Page 1 of 3
DATED : April 28, 1992
INVENTOR(S) : Helmut Hönig et al.

It is certified that error appears in the above-indentified patent and that said Letters Patent is hereby corrected as shown below:

Column 1, line 56, after "in the" delete "T".

Column 2, line 31, change "binder" to --binders--.

Column 2, line 47, change "while" to --whole--.

Column 2, line 52, change "700 t 10,000" to --700 to 10,000--.

Column 2, line 57, change "number of rom" to --number of from--.

Column 2, lines 1-2, after "describe" insert --combinations of CED binders containing primary and/or--.

Column 9, line 17, change "composition" to --codeposition--.

Column 9, line 56, change "gas" to --has--.

Column 9, line 61, change "sals" to --salts--.

Column 9, line 62, change "metals" to --chelates--.

Column 9, line 64, change "left" to --lead--.

Column 10, line 1, before "also" insert --(--.

Column 10, line 24, change "pillers" to --fillers--.

Column 10, line 33, change "be" to --by--.

UNITED STATES PATENT AND TRADEMARK OFFICE
CERTIFICATE OF CORRECTION

PATENT NO. : 5,109,040

DATED : April 28, 1992

INVENTOR(S) : Helmut Hönig et al.

It is certified that error appears in the above-indentified patent and that said Letters Patent is hereby corrected as shown below:

Column 10, line 50, change "thalateand" to --thalate and".

Column 11, line 44, change "631 L" to --631 g--.

Column 11, line 49, "mimethylenthanol-amine" to --dimethylethanol-amine--.

Column 11, line 56, change "iodne" to --iodine--.

Column 11, line 65, change "8g" to --348 g--.

Column 13, line 26, change "of a solution" to --of a 50% solution--.

Column 13, line 43, change "deionized" to --deionized water--.

Column 14, line 55, change "or synthetic" to --of synthetic--.

UNITED STATES PATENT AND TRADEMARK OFFICE
CERTIFICATE OF CORRECTION

PATENT NO. : 5,109,040
DATED : April 28, 1992
INVENTOR(S) : Helmut Hönig et al.

Page 3 of 3

It is certified that error appears in the above-indentified patent and that said Letters Patent is hereby corrected as shown below:

Column 14, line 65, change "(a)" to --(A)--.

Signed and Sealed this

Twenty-sixth Day of October, 1993

Attest:

BRUCE LEHMAN

Attesting Officer Commissioner of Patents and Trademarks